Patented Apr. 1, 1941

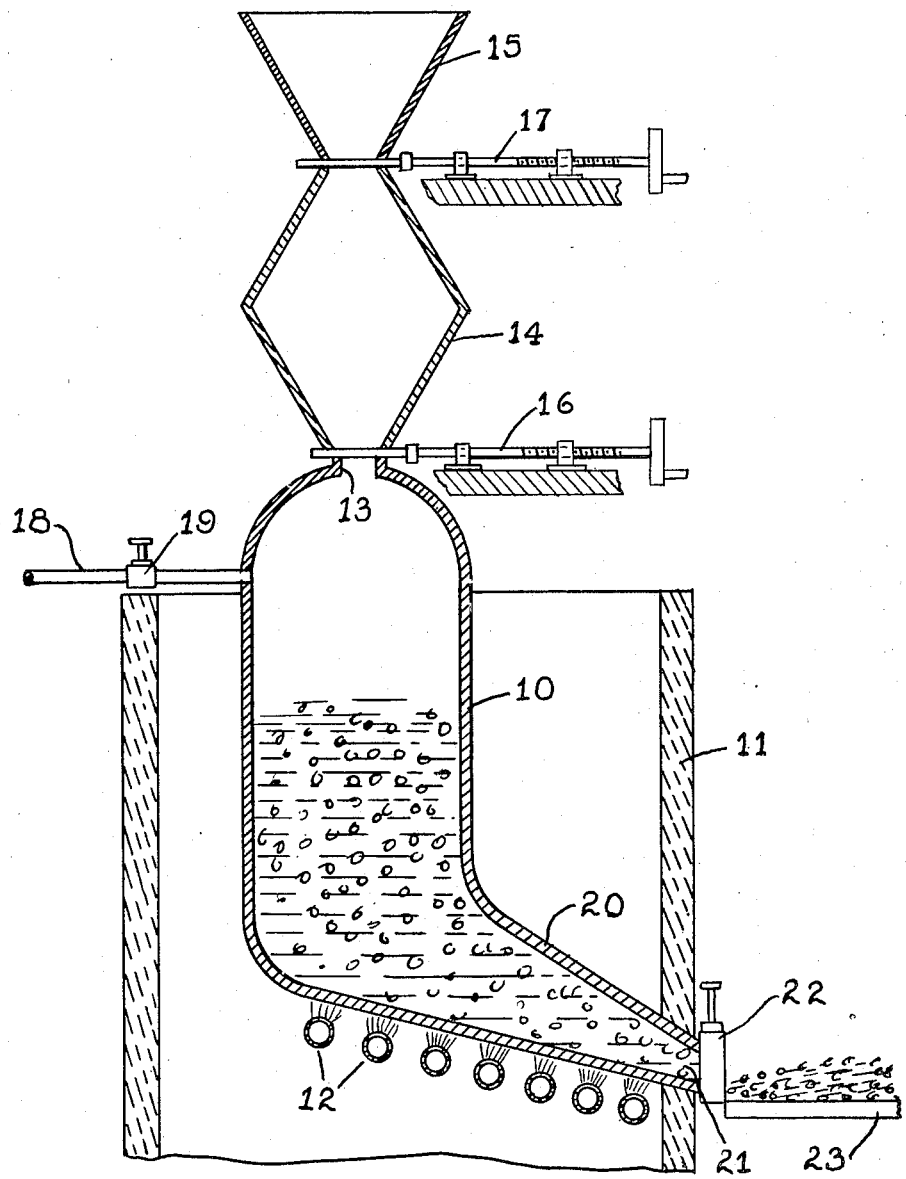

2,237,037

UNITED STATES PATENT OFFICE 2,237,037

METHOD OF PREPARING CELLULAR GLASS

William O. Lytle, New Kensington, Pa., assignor to Pittsburgh Plate Glass Company, Allegheny County, Pa., a corporation of Pennsylvania Application November 8, 1937, Serial No. 173,390

1 Claim. (Cl. 49—77)

The present invention relates to the manufacture of glass products and it has particular relation to the production of bodies of multi-cellular or porous glass.

One object of the invention is to provide a process of preparing a multi-cellular glass in which the cells are uniformly distributed and which does not require the addition of gasifying agents to the glass in order to produce the cells or vesicles.

A second object of the invention is to provide a process of preparing multi-cellular glass by use of which relatively large quantities of such glass can be formed by continuous operation into a slab of suitable thickness to be cut up into structural blocks.

These and other objects will be apparent from consideration of the following specification and claim.

It has heretofore been proposed to form blocks of multi-cellular glass by admixture of carbonaceous material with molten glass, thereby inducing a chemical reaction to liberate free gases such as carbon dioxide as bubbles or vesicles in the glass. The mass was then placed in suitable molds and allowed to expand to fill the latter after which the resultant blocks were cooled and removed. The multi-cellular product was of relatively low apparent specific gravity and possessed high heat and sound insulating properties.

Such process was objectionable for many reasons, for example, the carbonaceous material was more or less expensive to obtain. Uniform distribution of the gassing agent in the viscous glass was difficult to obtain and during the process of mixing a part of the gas generated was likely to be lost. Moreover the process of filling the partially expanded masses into molds was a laborious operation.

According to the provisions of the present invention, glass in crushed or pulverized form and containing air or other gas, under pressure, in the voids between the particles is sintered to a plastic mass and the pressure upon the mass is then released to allow the bubbles of compressed gas contained therein to expand. An additional feature of the invention involves the extrusion of the plastic mass containing the bubbles of compressed or dissolved gases through an orifice of such dimensions as to impart the desired cross-sectional contour to the mass. The extruded body may then be cooled and annealed and afterwards cut into sections of suitable length.

For a better understanding of the invention reference may now be had to the drawing in which the single figure is a cross-sectional view of a simple embodiment of apparatus suitable for use in practicing the invention.

In the form of the invention disclosed, a column-like chamber or container 10 (preferably of a relatively heat resistant material and of sufficient strength to resist considerable internal pressure) is disposed in a furnace 11 heated by suitable means, for example, by conventional gas burners 12. At its upper extremity the container is provided with an inlet 13 for the admission of crushed or pulverized glass communicating with a chamber 14 that constitutes an air lock and which further communicates with a hopper 15. Slide valves 16 and 17 close the passage 13 and the throat of hopper 15. A conduit 18 for the introduction of air or other suitable fluid also projects into the upper extremity of the chamber and may be closed by means of a valve 19. The bottom portion 20 of the container tapers and curves laterally through the side of the furnace to a tip having an orifice 21 of appropriate size and shape for the extrusion of the sintered or molten glass, which orifice is closed by means of a suitable slide valve 22. The material charged with gas under compression as it emerges from the orifice is discharged upon a table or a conveyor 23 where it is expanded by the interior pressure exerted by the occluded and/or dissolved gases after which it is carried through a suitable annealing leer (not shown).

The mode of operation of the apparatus is relatively simple. Ground glass or cullet is added through the opening 13 in the top of the container 10 after which the valves 16 and 22 are closed. A suitable fluid, for example air, carbon dioxide, nitrogen or the like is injected through conduit 18 into the container 10 until the pressure is raised to sufficient value to give the desired ratio of gases dissolved in or entrapped in the interstices between the particles of glass in the container. Simultaneously heat is applied to the container until the temperature is raised sufficiently (e. g. 1500 or 1600° F.) to sinter or melt the particles of glass down into a coherent but porous or cellular state in which each cell is filled with gas under compression. The valve 22 in orifice 21 is then opened and the cellular glass is forced out by fluid pressure as a viscous mass upon the table 23. Upon emergence from the pressure vessel the gases contained as vesicles or bubbles in the plastic glass tend to expand and thereby increase the porosity of the mass. Subsequently the glass is annealed and cut into blocks of suitable dimensions. If the orifice 21 is of proper size and shape the stream of glass after it has expanded will correspond approximately to the cross-sectional dimensions of the finished blocks.

After the material in the chamber is partially or completely discharged, fresh pulverized glass is charged from hopper 15. This is accomplished by opening the valve 17 while valve 16 is closed in order to permit the contents of the hopper 15 to fall into the intermediate chamber 14. The valve 17 is then closed to seal the chamber 14 from the atmosphere, the valve 16 is opened to permit the glass to fall into container 10 and valve 16 is closed. The chamber 10 may thus be charged without releasing the pressure therein and without interrupting the flow of material from orifice 21.

The product obtained will comprise a mass of vesicular glass of low apparent density in which the voids or cells are quite uniformly distributed. By increasing or decreasing the pressure employed in the melting chamber the degree of expansion and therefore the density of the mass can be controlled at will.

Obviously, water or other suitable fluid may be admixed with the cullet before introduction, or may be introduced into the vessel after the introduction of the cullet. Long prior to the melting or sintering of the granular glass the water is completely converted into steam and acts as a gaseous medium for the formation of bubbles in the glass. Considerable amounts of the water are absorbed rather than being merely occluded in the glass and this absorbed water upon release of pressure upon the glass tends further to increase the volume of bubbles generated in the latter. Manifestly, the size of these bubbles formed by the absorption and expansion of the absorbed water will be small and distribution will be uniform.

If desired pulverized glass may be charged in appropriate amounts into molds or chambers and then heated under pressure, for example, by electrical resistances to fuse or sinter the particles of glass. Upon release of the pressure, the gases occluded in the glass will expand the latter to fill the mold or chamber. After the glass is cooled sufficiently, it may be removed.

Although the preferred forms of the invention have been shown and described it will be apparent to those skilled in the art that numerous modifications may be made therein without departing from the spirit of the invention or the scope of the appended claim.

What I claim is:

A process of forming a multi-cellular glass which comprises heating pulverized glass admixed with water in a closed container, and continuing to heat the material under pressure until the particles of glass are sintered together to form a coherent viscous mass, containing small bubbles of entrapped steam under pressure, then reducing the pressure upon the mass, while it is still viscous, to effect cellulation of the mass by expansion of the compressed steam entrapped therein, and subsequently cooling the resultant body.

WILLIAM O. LYTLE.